United States Patent [19]

Mellum et al.

[11] Patent Number: 5,333,678
[45] Date of Patent: Aug. 2, 1994

[54] AUXILIARY POWER UNIT

[75] Inventors: Ronald J. Mellum, Delano; Peter M. Hawkins, Jr., Mounds View; Glennard M. Kline, Anoka; Deborah A. Klinkert, St. Louis Park, all of Minn.; Ronald G. McFarlane, Seattle; Gary P. Hansen, Federal Way, both of Wash.

[73] Assignee: Onan Corporation, Minneapolis, Minn.

[21] Appl. No.: 847,946

[22] Filed: Mar. 6, 1992

[51] Int. Cl.$^5$ ............................................. B60H 3/00
[52] U.S. Cl. ................................. 165/42; 62/236; 122/26; 237/12.3 B; 237/12.3 C
[58] Field of Search .................. 165/43, 42; 62/236; 122/26; 237/12.3 B, 12.3 C, 12.1

[56] References Cited

U.S. PATENT DOCUMENTS

| Re. 33,687 | 9/1991 | Greer . |
|---|---|---|
| 1,255,776 | 4/1929 | Starr . |
| 1,974,907 | 9/1934 | Worth . |
| 1,992,568 | 2/1935 | Connor . |
| 2,070,615 | 2/1937 | Plante . |
| 2,115,472 | 4/1938 | Sargent . |
| 3,373,728 | 3/1968 | Collins . |
| 3,844,130 | 10/1974 | Wahnish . |
| 3,885,398 | 5/1975 | Dawkins . |
| 4,271,677 | 6/1981 | Harr . |
| 4,382,463 | 5/1983 | Ikebukuro . |
| 4,424,775 | 1/1984 | Mayfield, Jr. et al. . |
| 4,448,157 | 5/1984 | Eckstein et al. . |
| 4,531,379 | 7/1985 | Diefenthaler, Jr. . |
| 4,658,599 | 4/1987 | Kajiwara . |
| 4,732,229 | 3/1988 | Lucht . |
| 4,756,359 | 7/1988 | Greer . |
| 4,762,170 | 8/1988 | Nijjar et al. . |
| 4,825,663 | 5/1989 | Nijjar et al. . |

OTHER PUBLICATIONS

"Onan Sales Application Guide: Auxiliary Power Generators for Long Haul Trucks", Onan AUX., (Aug. 1980).

Primary Examiner—A. Michael Chambers
Attorney, Agent, or Firm—Merchant, Gould, Smith, Edell, Welter & Schmidt

[57] ABSTRACT

The present invention is directed to an auxiliary power unit for use with a vehicle, typically a truck. The truck has a cab and a sleeper to which the auxiliary power unit provides auxiliary air conditioning and heating. The truck also has a cab evaporator, a sleeper evaporator, a compressor, a condenser, and a plurality of refrigerant lines, a cab heater, a sleeper heater, and a plurality of coolant lines. The auxiliary power unit has an auxiliary evaporator and a plurality of auxiliary refrigerant lines. The auxiliary evaporator is arranged in series with the sleeper evaporator and the sleeper heater. The auxiliary refrigerant lines are separate and distinct from the truck's plurality of refrigerant lines. The auxiliary power unit also has a plurality of auxiliary coolant lines which are interconnected with the truck's plurality of coolant lines. The interconnection is accomplished in such a way that the auxiliary power unit can provide heat to the sleeper heater when the truck engine is running or when the truck is not running. If the coolant becomes excessively hot, a by-pass thermostat and valve direct the coolant to an auxiliary radiator. The auxiliary power unit has an auxiliary control panel in the sleeper to provide control of the heating and cooling in the sleeper when the truck engine and/or auxiliary engine is running.

22 Claims, 8 Drawing Sheets

AUXILIARY POWER UNIT

TECHNICAL FIELD

This invention relates to the apparatus for providing auxiliary air conditioning, heating, and power to a vehicle.

BACKGROUND OF THE INVENTION

Auxiliary power units for providing auxiliary cooling, heating, and power to a vehicle are known. Auxiliary power units are often used by cross-country truckers. Trucks used by cross-country truckers are generally equipped with a sleeper compartment located behind a truck cab so that the trucker has a convenient place to sleep while enroute.

The truck has a main engine, hereinafter referred to as the truck engine, a heating system typically including a heater in the cab of the truck and a heater in the sleeper, and an air conditioning system typically including an evaporator for the cab of the truck and one for the sleeper. When the trucker parks the truck to rest or sleep, heating and air conditioning in the sleeper is provided by running the truck's engine. It is highly inefficient, however, to run the truck's engine merely to provide heating and air conditioning. It is much more efficient to use auxiliary power units, which usually have a small auxiliary engine, to provide power for heating and cooling.

In cold weather, trucker's often idle the truck's engine while the vehicle is parked. This is done to keep the truck's motor oil, diesel fuel, and engine warm so that it will restart. It is known to use an engine to keep the truck's engine warm by interconnecting the cooling system of the auxiliary engine to the truck's engine.

The auxiliary power units available can also generate electric power for various other truck accessories, such as lights and electric power receptacles.

Various approaches for providing auxiliary air conditioning, heating, and/or power are known. See, for example, U.S. Pat. No. 4,825,663 to Nijjar and U.S. Pat. No. RE 33,687 to Greer. In some of these approaches, a separate air conditioning system including its own engine, compressor, condensor, evaporator, and fan are installed. In yet other systems the truck's fan and evaporator are operated by an auxiliary engine having its own compressor and condenser.

In systems which use the truck's fan and evaporator, the truck's refrigerant lines and the auxiliary refrigerant lines are interconnected so that the auxiliary compressor can pump refrigerant through the truck's refrigerant lines. This means that both the auxiliary refrigerant compressor and the truck's refrigerant compressor are on the same system of refrigerant lines. With this arrangement, one of the refrigerant compressors would be seriously damaged if both compressors are run simultaneously. To prevent damage to one of the compressors, a switching mechanism has been used in auxiliary power units, prior to the present invention, so that when one compressor is activated, the other is turned off. Even with the switching mechanism, however, having two compressors on the same system of refrigerant lines can lead to failure of one of the compressors because lubricant in the refrigerant tends to migrate and collect in one of the compressors, thereby under-lubricating the other. Moreover, if a leak develops in the refrigerant lines, this might result in a loss of refrigerant for the entire system. Additionally, if the evaporator of the truck's air conditioning system is inoperable, air conditioning cannot be provided by operation of the truck's engine or the auxiliary engine.

When installing auxiliary power units, prior to this invention, a plurality of auxiliary coolant lines were interconnected with a plurality of standard coolant lines in the truck. The interconnection was provided so that the auxiliary power unit could provide heated coolant to the heating units within the truck by way of the truck's coolant lines.

SUMMARY OF THE INVENTION

The present invention is directed toward an auxiliary power unit for use with a vehicle, usually a truck. The truck has as standard equipment a truck engine, a cab, a sleeper, a cab evaporator, a sleeper evaporator, a compressor, a condenser, and a plurality of refrigerant lines, a cab heater, a sleeper heater, a plurality of coolant lines, a cab fan, and a sleeper fan. When the truck engine is in use, the truck fan, the sleeper fan, the cab evaporator, the sleeper evaporator, the compressor, and the condenser can be activated by a user to provide air conditioning to the cab and/or sleeper. The truck engine can also provide coolant, through the plurality of coolant lines to the cab heater and/or sleeper heater to heat the cab and sleeper, respectively.

The auxiliary power unit comprises an auxiliary engine, an auxiliary compressor, an auxiliary condenser, an auxiliary evaporator, a DC alternator, and a plurality of auxiliary refrigerant lines. The auxiliary refrigerant lines are separate and distinct from the vehicle's refrigerant lines. The auxiliary refrigerant lines interconnect the auxiliary condenser to the auxiliary evaporator which is arranged in series with the sleeper fan, the sleeper heater, and the sleeper evaporator. The auxiliary power unit also comprises a plurality of auxiliary coolant lines. The auxiliary coolant lines are interconnected with the vehicle's coolant lines and to the auxiliary engine through a valving means that allows the auxiliary engine and the truck engine to run at the same time. Thus, the cab fan, the sleeper fan, the cab heater, and the sleeper heater can be activated by the user, to provide heat to the cab and/or the sleeper, and be powered by the auxiliary engine, the truck engine, or the auxiliary engine and/or the truck engine.

When the auxiliary engine is in use, the sleeper fan, auxiliary compressor, auxiliary condenser, and auxiliary evaporator can be activated by the user and be powered by the auxiliary engine to provide air conditioning for the sleeper. Because the auxiliary refrigerant lines are separate and distinct from the vehicle's refrigerant lines, the vehicle's compressor and the auxiliary compressor can be run at the same time.

These advantages and other objects obtained with this invention are further explained hereinafter with more particularity and by reference to the preferred embodiment as shown in the following drawings.

BRIEF DESCRIPTION OF THE DRAWINGS

Referring now to the drawings wherein like reference numerals designate identical or corresponding parts throughout the several views.

DETAILED DESCRIPTION OF THE PREFERRED EMBODIMENT

Figure 1:
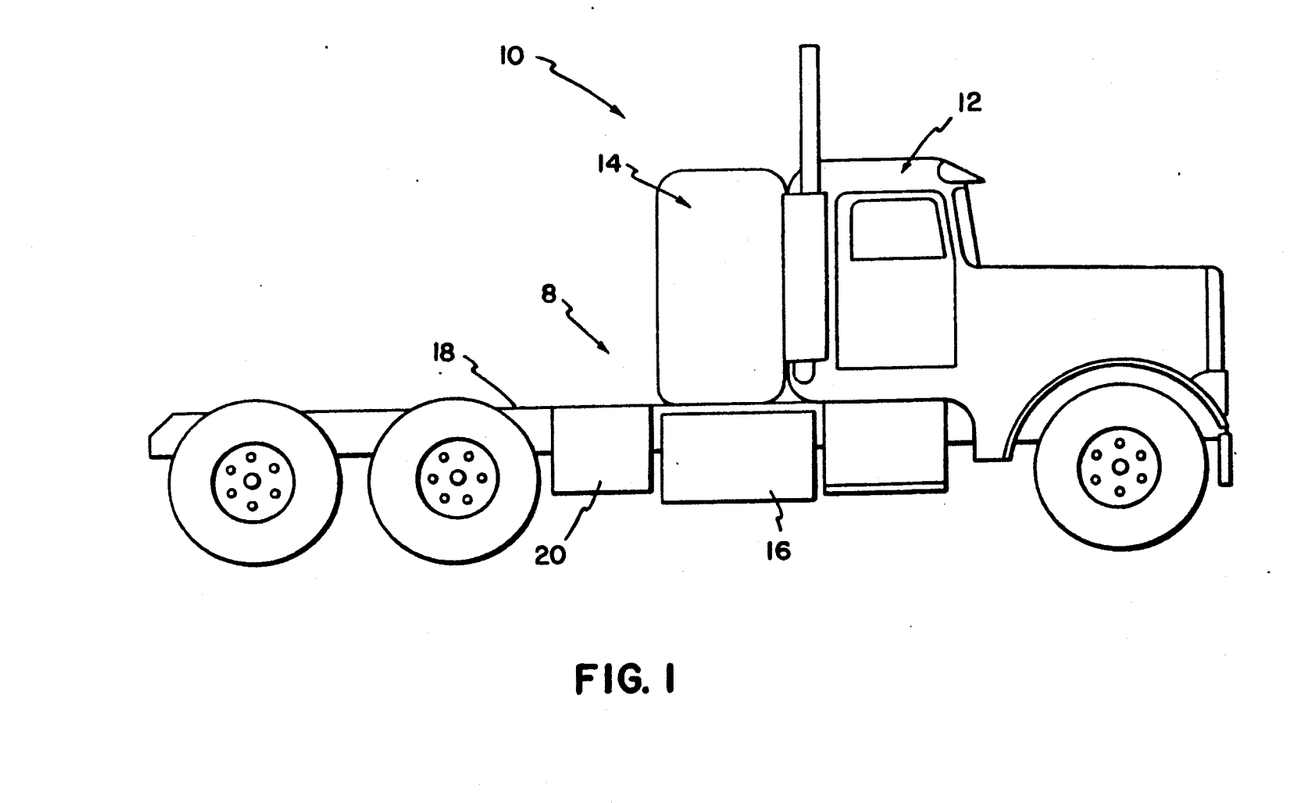
FIG. 1 is a side view of a truck with an auxiliary power unit installed.
Figure 2A:
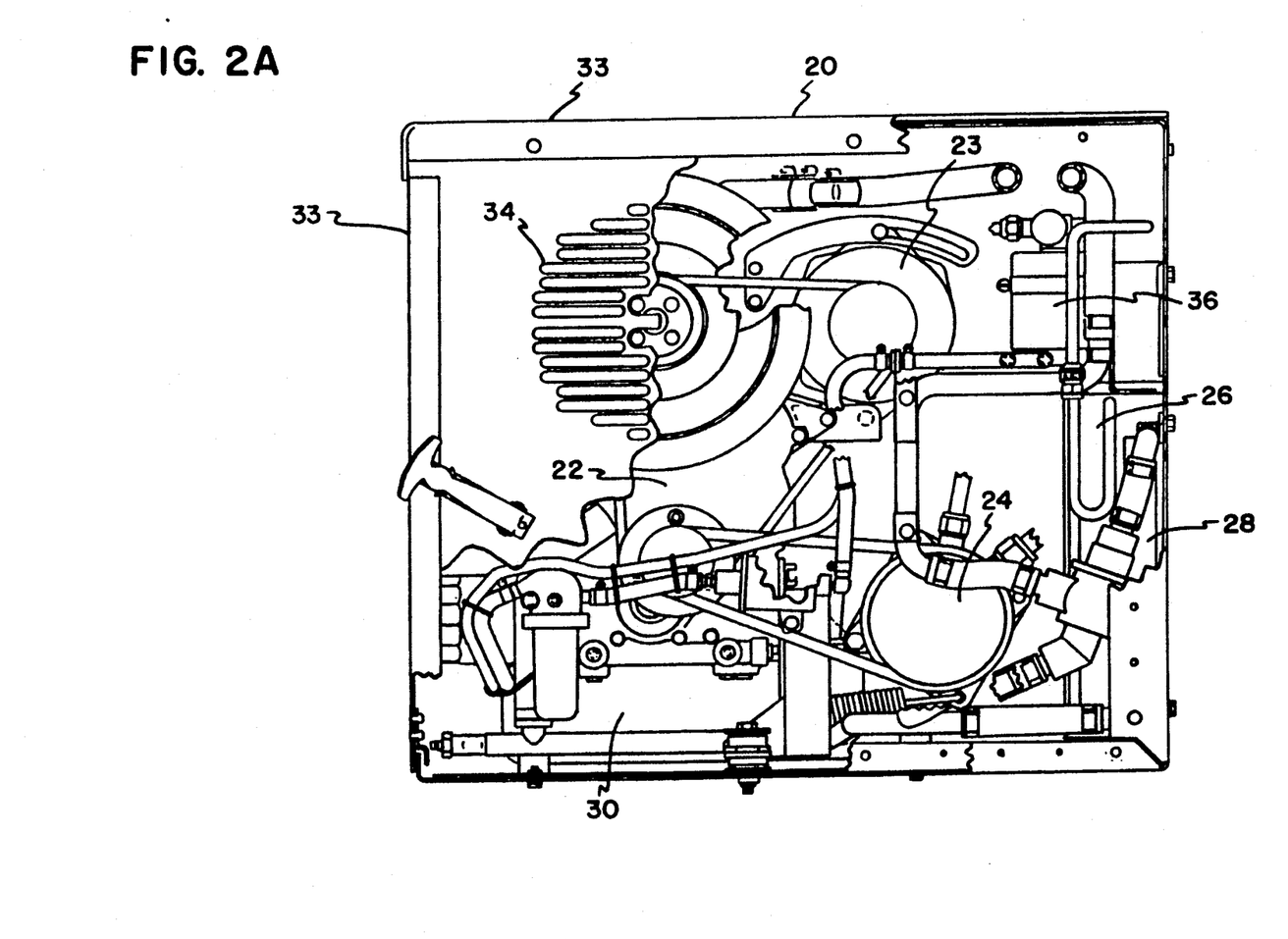
FIG. 2A is a first-side cutaway view of a housing for an auxiliary engine and other components of an auxiliary power unit.
Figure 2B:
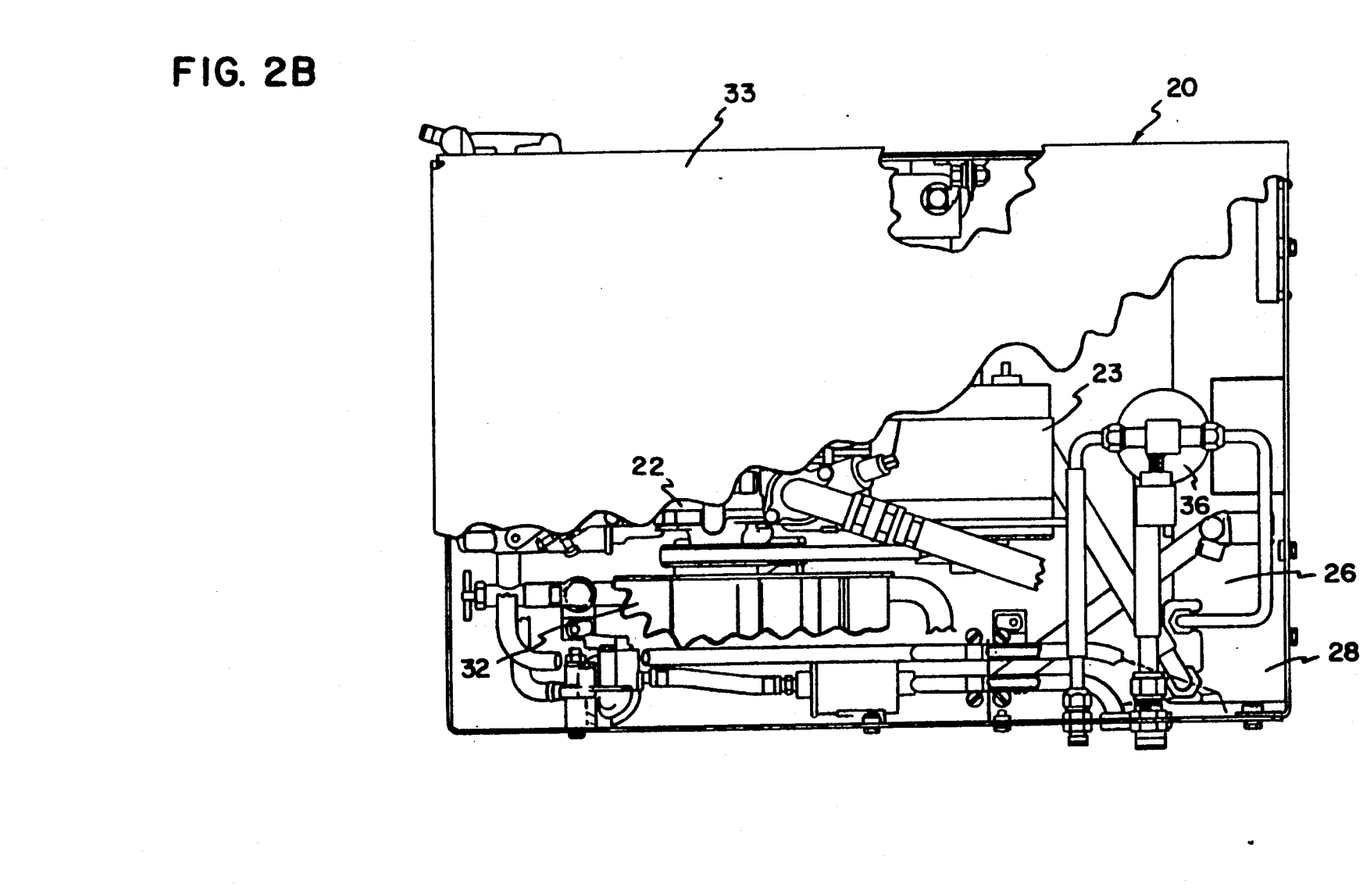
FIG. 2B is a top view of the housing shown in FIG. 2A.

An auxiliary power unit for providing auxiliary air conditioning, heating and power to a vehicle is shown generally as 8 in FIG. 1. In the preferred embodiment, the vehicle is a truck 10 with a driving area, hereinafter referred to as a cab 12, and an alternative use area, hereinafter referred to as a sleeper 14. The truck 10 has at least one fuel tank 16 and a set of rails 18.

A housing 20 containing a portion of the auxiliary power unit 8 is mounted on the rails 18 or elsewhere. Located within the housing 20 is an auxiliary engine 22, for example, a Kubota Model Z482-B diesel 9.5 Hp at 2600 RPM shown in FIGS. 2A-3B. The auxiliary engine 22 is equipped with an oversized oilpan 30. The oilpan 30 is oversized so that the auxiliary engine's servicing interval will correspond to that of the vehicle's main engine, hereinafter referred to as the truck engine 41, which is, for example, a Cummins N-14. The truck engine 41 and the auxiliary engine 22 use fuel from the fuel tank 16 or from a driver's side fuel tank on the opposite side of the truck 8.

Also within the housing 20 is an auxiliary DC alternator 23, an auxiliary compressor 24, an auxiliary condenser 26, and an auxiliary radiator 28. The auxiliary condenser 26 and auxiliary radiator 28 are arranged in series air flow. An auxiliary engine fan 32, and a refrigerant filter dryer 36 are also within the housing 20. Service access to the contents of the housing 20 is available through service panels 33.

Figure 3A:
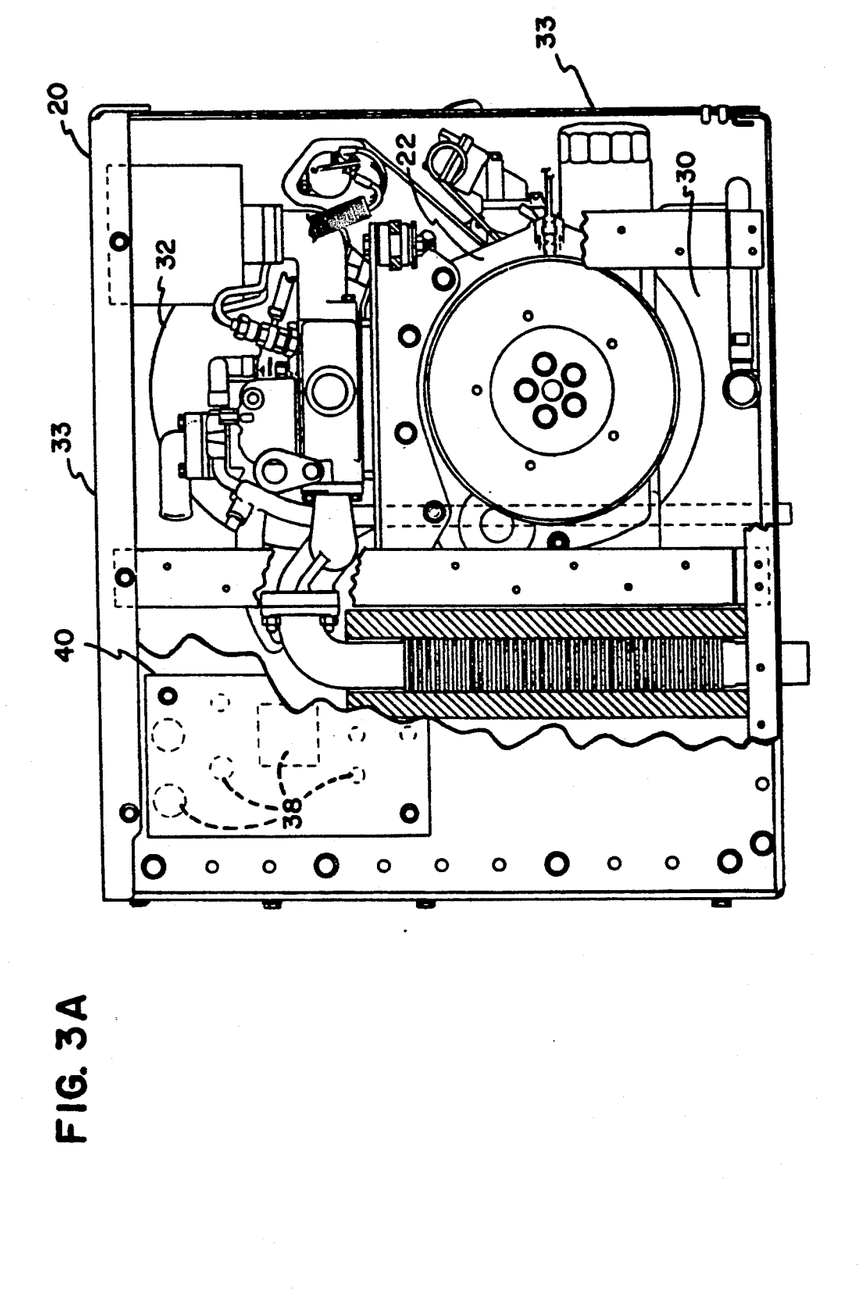
FIG. 3A is a second-side cutaway view of the housing shown in FIG. 2A.
Figure 3B:
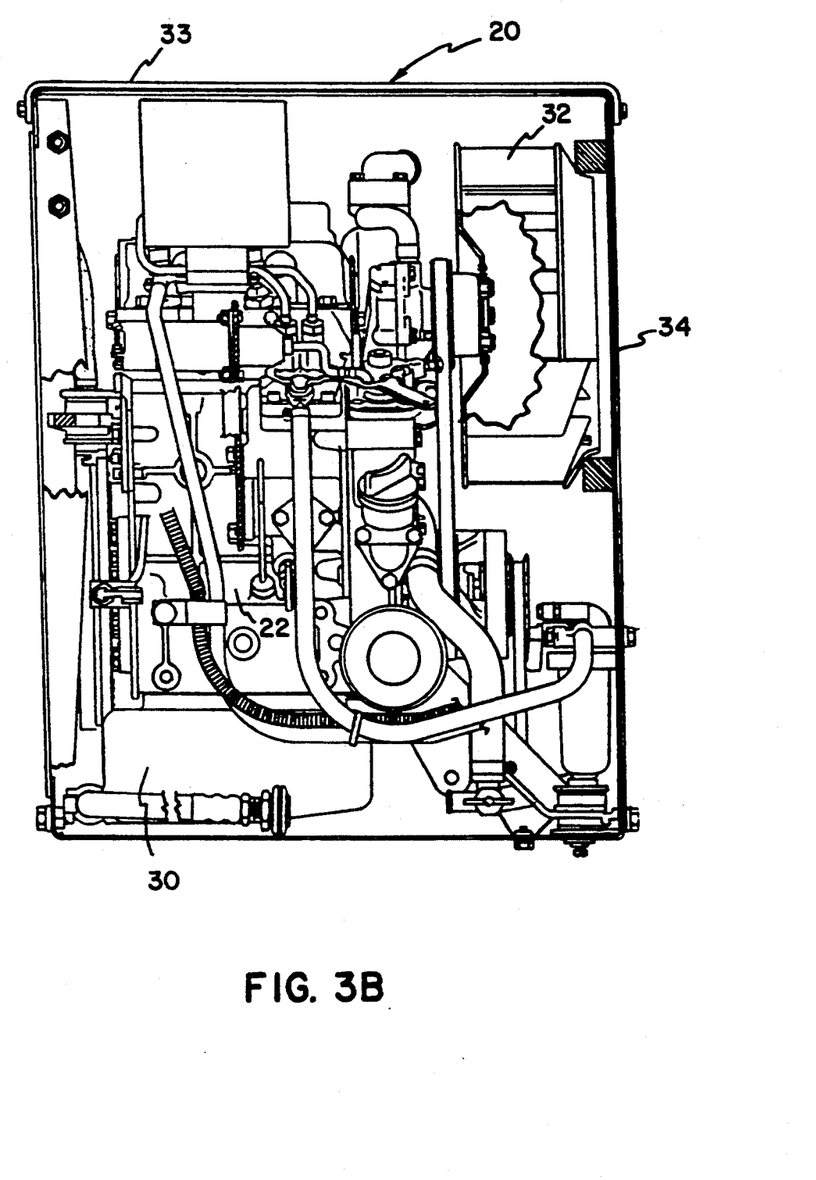
FIG. 3B is a third-side view of the housing shown in FIG. 2A.

The housing 20 is substantially sealed except for an intake 34 for the auxiliary engine fan 32, two sets of interface ports 38, and an area for air passing through the auxiliary condenser 26 and auxiliary radiator 28 to exit the housing 20. One of the sets of interface ports 38 is located on a second side of the housing 20, as shown in FIG. 3A, and the other set is located in a mirror image arrangement on a first side of the housing 20. Only one set of interface ports 38 is used when the housing 20 is installed on the rails 18. That set of interface ports 38 is the one closest or most convenient to the sleeper 14 and cab 12. The other set of interface ports 38 is covered with an interface port cover 40.

Because the housing 20 is substantially sealed, the auxiliary engine fan 32 need not be located proximate the auxiliary condenser 26 and auxiliary radiator 28. Air drawn into the housing 20 through the intake 34 for the auxiliary engine fan 32 slightly pressurizes the housing 20. The pressure created is sufficient to force air through the auxiliary condenser 26 and auxiliary radiator 28 and out of the housing 20.

Figures 4A, 4B:
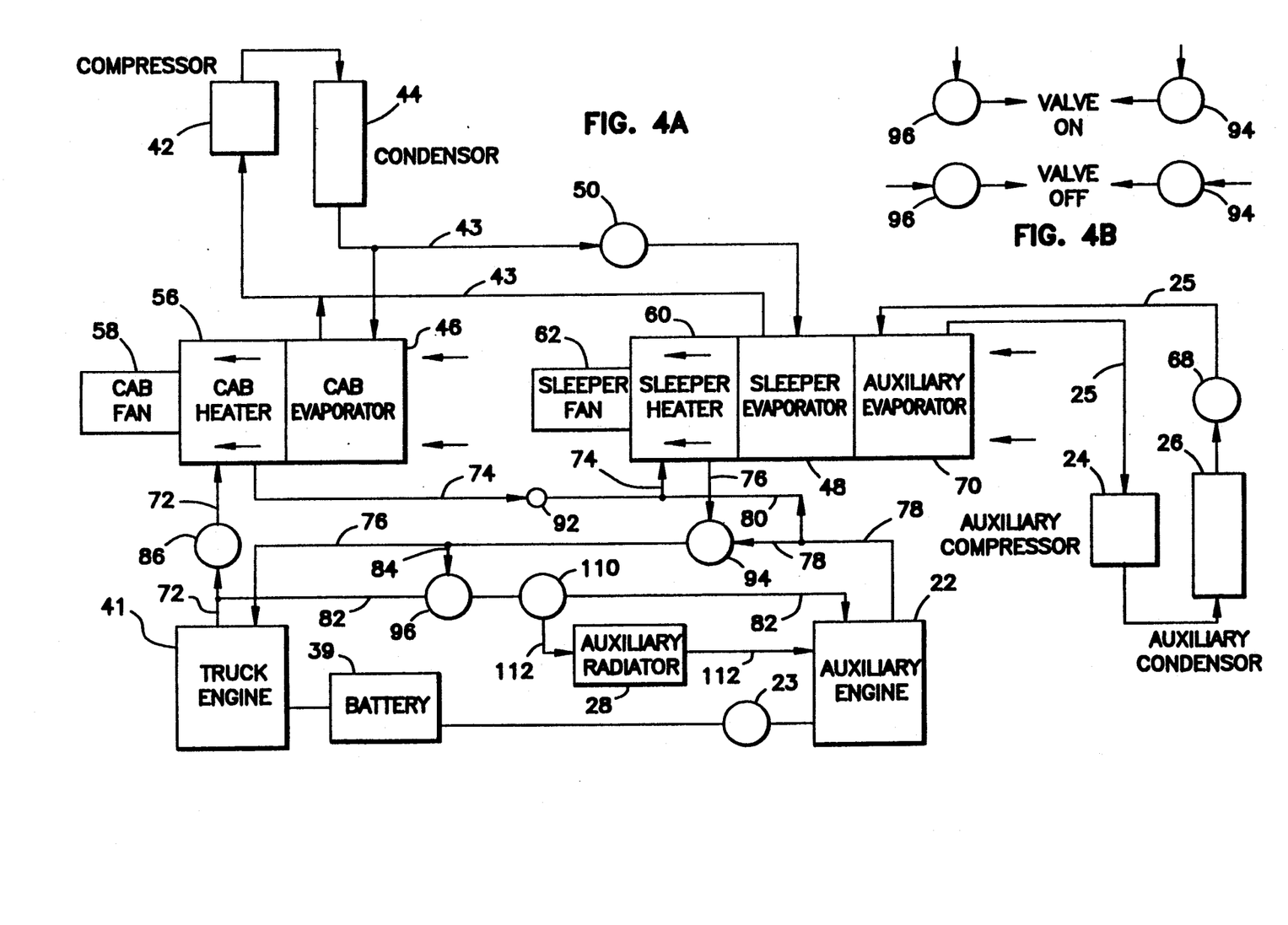
FIG. 4A is a schematic of the auxiliary power unit installed in a truck having a standard series arrangement of coolant lines.
FIG. 4B is a schematic showing the operation of two valves shown in FIG. 4A.

The truck 10 also has a battery 39 which stores power for use in various aspects of the truck's operations, which are well known to those skilled in the art, such as powering the truck's ignition, lights, and other devices. The auxiliary DC alternator 23 of the auxiliary power unit 8 is interconnected with the truck's battery 39 as shown in FIG. 4A. This interconnection allows the auxiliary DC alternator 23 to recharge the battery 39.

The truck 10 is equipped with air conditioning as a standard feature. Referring to FIG. 4A, the truck's air conditioning includes a compressor 42 and a condenser 44. Additionally, located within the cab 12 is a driving area evaporator, hereinafter referred to as cab evaporator 46, and located within the sleeper 14 an alternative use area evaporator, hereinafter referred to as a sleeper evaporator 48. The cab 12 is equipped with a driving area fan, hereinafter referred to as a cab fan 58, and the sleeper 14 is equipped with an alternative use area fan, hereinafter referred to as a sleeper fan 62. A tractor solenoid valve 50 is located proximate the sleeper evaporator 48. These components are interconnected by a plurality of refrigerant lines 43 and controlled by a user from two control panels, including a first control panel in the cab 12 and a second control panel in the sleeper 14.

The auxiliary air conditioning provided by the auxiliary power unit 8 is created by the auxiliary compressor 24, the auxiliary condenser 26, the auxiliary compressor clutch 68 and the auxiliary evaporator 70. The auxiliary evaporator 70 is arranged in series air flow with the sleeper evaporator 48. The auxiliary compressor 24, the auxiliary condenser 26, and the auxiliary evaporator are interconnected with a plurality of auxiliary refrigerant lines 25. The auxiliary refrigerant lines 25 are separate and distinct from the truck's refrigerant lines 43.

The truck 10 is also equipped with heating as standard equipment. This includes a driving area heater, hereinafter referred to as a cab heater 56, arranged in series airflow with the cab evaporator 46. The truck also has an alternative use area heater, hereinafter referred to as a sleeper heater 60, arranged in series air flow with the sleeper evaporator 48 and auxiliary evaporator 70, and a plurality of coolant lines. The plurality of coolant lines generally interconnect the cab heater to the sleeper heater either in a series arrangement, as shown in FIG. 4A, or in a parallel arrangement, as shown in FIG. 5A.

In the standard series arrangement, the cab heater 56 and the sleeper heater 60 are interconnected by the plurality of coolant lines in series. As shown in FIG. 4A, the plurality of coolant lines for the series arrangement includes a first coolant line 72, a second coolant line 74, and a third coolant line 76. The first coolant line 72 interconnects the truck engine 41 to the cab heater 56. The second coolant line 74 interconnects the cab heater 56 to the sleeper heater 60 and the third coolant line 76 interconnects the sleeper heater 60 to the truck engine 41. A series coolant valve 86 controls the flow of coolant through the series system. The series coolant valve 86, cab fan 58, truck engine 41, and the cab heater 56 are operated from the control panel in the cab 12 by the user.

Figures 5A, 5B:
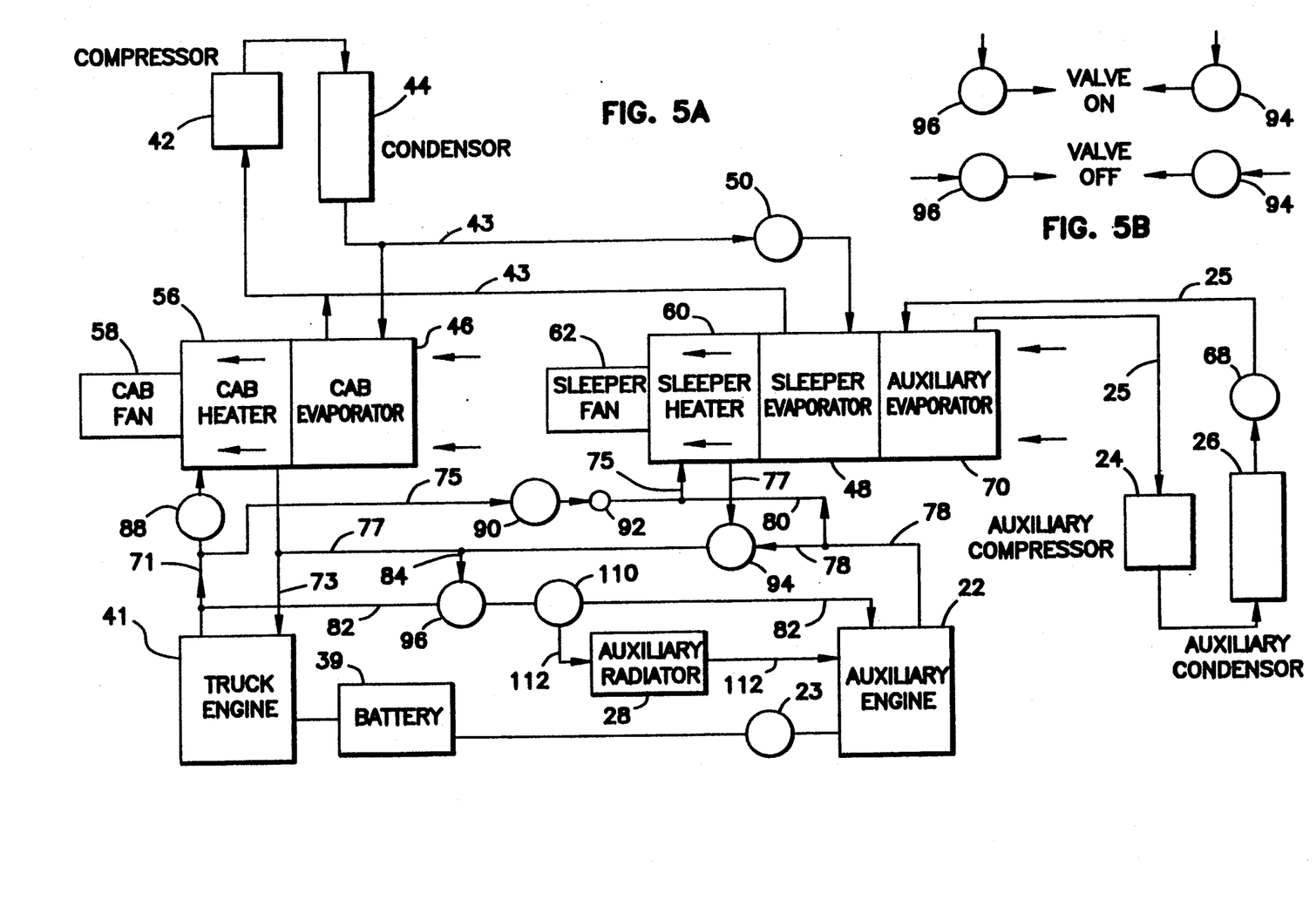
FIG. 5A is a schematic showing the auxiliary power unit installed in a truck having a standard parallel arrangement of coolant lines.
FIG. 5B is a schematic showing the operation of two valves shown in FIG. 5A.

An alternative to the series system, the parallel system, is shown in FIG. 5A. The parallel system includes the cab heater 56, the sleeper heater 60, and a plurality of coolant lines including a first parallel arrangement coolant line 71, a second parallel arrangement coolant line 73, a third parallel arrangement coolant line 75, and a fourth parallel arrangement coolant line 77. The parallel system also includes a first parallel coolant valve 88 and a second parallel coolant valve 90. The first parallel coolant valve 88, the truck engine 41, and the cab fan 58 are operated by the user from the first control panel in the cab 12. The second parallel coolant valve 90 is controlled from the second control panel in the sleeper 14.

In the parallel system, the cab heater 56 and the sleeper heater 60 are interconnected by the plurality of coolant lines in parallel. The first parallel arrangement coolant line 71 interconnects the truck engine 41 to the cab heater 56. The second parallel arrangement coolant line 73 interconnects the cab heater 56 back to the truck engine 41. The sleeper heater 60 is interconnected with the truck engine 41 through the first parallel arrangement coolant line 71, which is interconnected with the third parallel arrangement coolant line 75. The sleeper heater 60 is also interconnected with the truck engine 41 by the fourth parallel arrangement coolant line 77 and the second parallel arrangement coolant line 73.

The auxiliary power unit 8 can be installed in a truck with either a series or parallel arrangement of coolant lines. Auxiliary heat is provided to the truck engine 41 and/or the sleeper heater 60 by interconnecting a plurality of auxiliary coolant lines, including a first auxiliary coolant line 78, a second auxiliary coolant line 80, a third auxiliary coolant line 82, and a fourth auxiliary coolant line 84 to the truck's plurality of coolant lines. A valving means, including a check valve 92, a first auxiliary valve 94, and a second auxiliary valve 96, is used to control the flow of coolant through the truck's plurality of coolant lines and the plurality of auxiliary coolant lines.

The plurality of auxiliary coolant lines and valving means are interconnected with the standard series arrangement, as shown in FIG. 4A, as follows. The first auxiliary coolant line 78 leaves the auxiliary engine 22 and interconnects with the third coolant line 76 at the first auxiliary valve 94. The second auxiliary coolant line 80 connects the first auxiliary coolant line 78 with the second coolant line 74. Proximate the interconnection of the second auxiliary coolant line 80 and the second coolant line 74 is the check valve 92. The third auxiliary coolant line 82 is interconnected with the first coolant line 72 and the auxiliary engine 22. The fourth auxiliary coolant line 84 interconnects the third coolant line 76, from a location on the third coolant line 76 between the first auxiliary valve 94 and the truck engine 41, to the third auxiliary coolant line 82 at the second auxiliary valve 96.

The plurality of auxiliary coolant lines and the valving means are interconnected with the parallel arrangement, as shown in FIG. 5A, as follows. A first auxiliary coolant line 78 leaves the auxiliary engine 22 and interconnects with the fourth parallel arrangement coolant line 77 at the first auxiliary valve 94. The second auxiliary coolant line 80 interconnects the first auxiliary coolant line 78 with the third parallel arrangement coolant line 75. Proximate the intersection of the second auxiliary coolant line 80 and the third parallel arrangement coolant line 75 is the check valve 92. The third auxiliary coolant line 82 interconnects the first parallel arrangement coolant line 71 with the auxiliary engine 22. The fourth auxiliary coolant line 84 interconnects the fourth parallel arrangement coolant line 77 from a location between the first auxiliary valve 94 and the second parallel arrangement coolant line 73, to the third auxiliary coolant line 82 at the second auxiliary valve 96.

When the auxiliary power unit 8 is installed in a truck 10 with the standard series arrangement of coolant lines, the truck engine 41, the cab heater 56, the cab fan 58, series coolant valve 86, compressor 42, condenser 44, and cab evaporator 46 continue to be controlled from the control panel in the cab 12. First auxiliary valve 94 and second auxiliary valve 96 must be open, however, for heated coolant to reach the cab heater 56. And when the auxiliary power unit 8 is installed in a truck 10 having a parallel arrangement of coolant lines, the first parallel coolant valve 88, second parallel coolant valve 90, cab fan 58, cab heater 56, compressor 42, condenser 44, and cab evaporator 46 continue to be controlled from the control panel in the cab 12. But first auxiliary valve 94 and second auxiliary valve 96 need not be open. The sleeper heater 60 and sleeper fan 62 as well as the auxiliary engine 22, first auxiliary valve 94, and second auxiliary valve 96 are controlled by the user from an auxiliary control panel 98, shown in FIG. 6, located in the sleeper 14. The auxiliary compressor 24 is also controlled from control panel 98, which replaces the existing second control panel in the sleeper 14.

Figure 6:
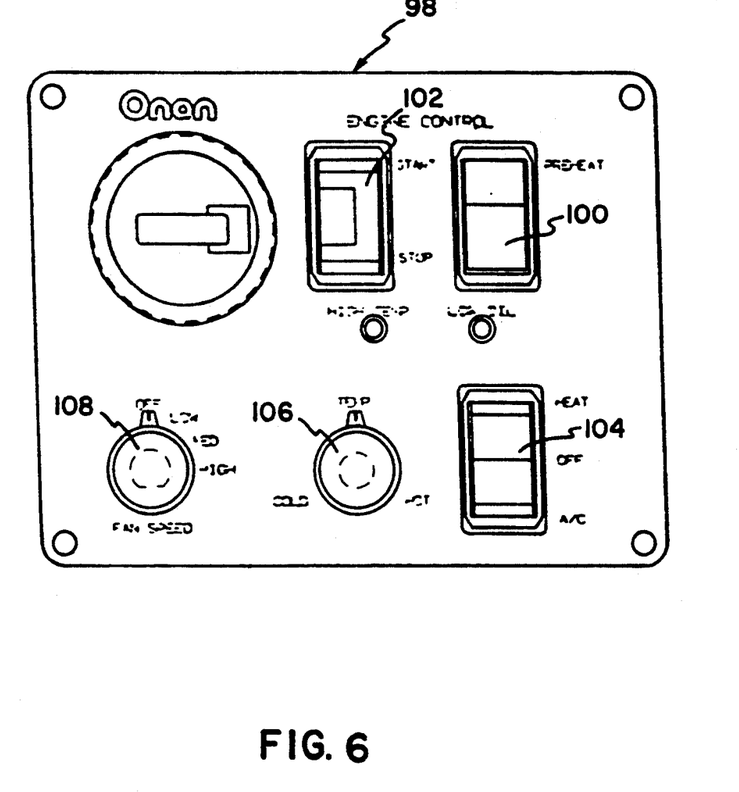
FIG. 6 shows an auxiliary control panel for controlling the auxiliary power unit.

The following controls are found on the auxiliary control panel 98: an auxiliary engine preheat switch 100, an auxiliary engine ignition switch 102, a heater/AC on/off switch 104, a temperature control switch 106, and a fan speed switch 108. The auxiliary engine preheat switch 100 controls the preheating of the auxiliary engine 22 prior to starting the auxiliary engine 22 with the auxiliary engine ignition switch 102. The heater/AC on/off switch 104 allows either the auxiliary compressor 24 to be turned on to provide air conditioning to the sleeper 14, or to turn on the first auxiliary valve 94 and the second auxiliary valve 96 to provide heat to the sleeper heater 60 or the cab heater 56 and sleeper heater 60. The temperature control switch 106 allows the user to control the temperature in the sleeper 14. The fan speed switch 108 lets the user control the speed of the sleeper fan 62.

As a fail safe device for protection of the auxiliary engine 22, the auxiliary power unit 8 is equipped with a by-pass thermostat and valve 110, as shown in FIGS. 4A and 5A. The by-pass thermostat and valve 110 is necessary to protect the integrity of the auxiliary power unit 8 and the truck engine 41. Occasionally, under hot operating conditions, the coolant may reach undesirable temperatures, for example 170° F. If this occurs, the by-pass thermostat reroutes the flow of coolant in the third auxiliary coolant line 82 into a by-pass coolant line 112 and through the auxiliary radiator 28. From the auxiliary radiator 28, the coolant continues on to the auxiliary engine 22 through by-pass coolant line 112. During normal operation, however, when the coolant is, for example, less than 170° F. the by-pass thermostat and valve 110 direct the coolant through the third auxiliary coolant line 82 directly to the auxiliary engine 22, conserving the heat energy in the coolant for use in heating.

In use, the cab 12 is air conditioned by the user turning on the compressor 42 from the control panel in the cab 14. The compressor 42 compresses a gaseous refrigerant, such as R-12 or R-134A. The refrigerant then flows to the condenser 44 where the refrigerant is condensed to a liquid state. From the condenser 44, the refrigerant passes to the cab evaporator 46 where the refrigerant returns to the gaseous state. Heat is absorbed by the evaporating refrigerant, cooling the cab evaporator 46. Warm air is drawn through the cab evaporator 46 by the cab fan 58, cooling the warm air. The cooled air is then pushed into the cab 12 by the cab fan 58.

The sleeper evaporator 48 can be used simultaneously with the cab evaporator 46. If the truck solenoid valve 50 is open, condensed refrigerant will flow not only into the cab evaporator 46, but also into the sleeper evaporator 48. The sleeper evaporator 48 is cooled by the same process as the cab evaporator 46. The sleeper fan 62 then draws warm air over the sleeper evaporator 48, cooling the air. The cooled air is then pushed into the sleeper 14.

When the auxiliary engine 22 is in operation, air conditioning can be provided by the auxiliary power unit 8. The auxiliary engine 22 powers the auxiliary compressor 24 when the heater/AC on/off switch 104 is switched to AC. The auxiliary compressor 24 compresses a gaseous refrigerant, for example, R-12 or R-134A. Then refrigerant flows into the auxiliary condenser 26 where the refrigerant enters the liquid state. The auxiliary compressor clutch 68 controls the refrigerant flow from the auxiliary condenser 26 to the auxiliary evaporator 70. The auxiliary evaporator 70 is cooled. Warm air is drawn over the auxiliary evaporator 70 by the sleeper fan 62, cooling the air. The cooled air is pushed into the sleeper 14 by the sleeper fan 62.

The user can control the air conditioning temperature within the sleeper 14 from the temperature control switch 106 by selecting the desired temperature setting. A thermostat within the sleeper 14 measures the temperature within the sleeper 14 and sends a signal to the auxiliary control panel 98 to shut off the compressor 24 if the temperature in the sleeper 14 falls below that selected. If the temperature in the sleeper 14 then rises above the temperature selected, the thermostat will send a signal to the auxiliary control panel 98 to reactivate the compressor 24.

If the truck engine 41 is running and the auxiliary engine 22 is off, the user can also control the air conditioning temperature within the sleeper 14 from the control panel 98. The thermostat within the sleeper sends a parallel signal to the auxiliary control panel 98 controlling the solenoid value 50 which controls the refrigerant flow to the sleeper evaporator 48. If the truck engine 41 and the auxiliary engine 22 are running, the temperature within the sleeper 41 continues to be regulated by the thermostat within the sleeper 14 which sends a signal to the auxiliary control panel 98 controlling both the solenoid valve 50 and the auxiliary compressor 24, which then regulates refrigerant flow to both the sleeper evaporator 48 and the auxiliary evaporator 70.

In the truck 10 equipped with the standard series arrangement of coolant lines and the auxiliary power unit 8, there are four modes of heating operation depending on whether only the truck engine 41 is running, whether only the auxiliary engine 22 is running, or whether the truck engine 41 and the auxiliary engine 22 are running. If only the truck engine 41 is running, both the cab heater 56 and sleeper heater 60 can be operated. If only the auxiliary engine 22 is in operation, only the sleeper heater 60 can be operated. If both the truck engine 41 and the auxiliary engine 22 are in operation, both the cab heater 56 and sleeper heater 60 can be operated or only the sleeper heater 60.

When the truck 10 is equipped with a standard parallel arrangement of coolant lines and the auxiliary power unit 8, there are seven modes of heating operation. If only the truck engine 41 is running, the cab heater 56 can be on, or the sleeper heater 60 can be on, or both the cab heater 56 and the sleeper heater 60 can be on. If only the auxiliary engine 22 is in operation, only the sleeper heater 60 can be in operation. If both the truck engine 41 and auxiliary engine 22 are in operation, only the cab heater 56 can be on, only the sleeper heater 60 can be on, or both the cab heater 56 and the sleeper heater 60 can be on.

For purposes of illustration, four modes of operation are described. Two modes for a truck 10 equipped with the standard series arrangement of coolant lines and the auxiliary power unit 8 are described, as well as two modes for a truck 10 equipped with the standard parallel arrangement of coolant lines and the auxiliary power unit 8.

A first mode illustrated is for the truck 10 equipped with the standard series arrangement of coolant lines and the auxiliary power unit 8. For this mode, only the auxiliary engine 22 is in operation with the sleeper heater 60 on. The sleeper heater 60 is turned on from the auxiliary control panel 98 in the sleeper 14, by switching the heater/AC on/off switch 104 to heat. The temperature control switch 106 and fan speed switch 108 are set to the desired settings. When the temperature control switch 106 is placed at a particular temperature setting, the thermostat within the sleeper 14 will measure the temperature within the sleeper 14 and send a signal to the auxiliary control panel 98 to operate the first auxiliary valve 94 and second auxiliary valve 96 if the temperature is outside the desired selection. When heat is desired in the sleeper 14, the control panel 98 receives a signal from the thermostat and sends a signal to the first and second auxiliary valves 94 and 96, turning them on. The direction of flow of coolant is from the auxiliary engine 22 into first auxiliary coolant line 78. The coolant then flows into the second auxiliary coolant line 80, and then to coolant line 74. From here the coolant must flow toward the sleeper heater 60 because the check valve 92 prevents the coolant from flowing in coolant line 74 to the cab heater 56. The coolant then enters the sleeper heater 60 where the sleeper fan 62 draws cool air over the sleeper heater 60 where it is warmed. The warmed air is then pushed into the sleeper 14 by the sleeper fan 62.

From the sleeper heater 60 the coolant flows through the third coolant line 76 to the first auxiliary valve 94. Here, because the first auxiliary valve 94 is on, coolant continues to flow in the third coolant line 76. And, because the second auxiliary valve 96 is on, coolant flows through auxiliary coolant line 84, through second auxiliary valve 96, through auxiliary coolant line 82, returning to the auxiliary engine 22. If, however, the temperature of the coolant in the auxiliary coolant line 82 is greater than a preset temperature, for example 170° F. in the preferred embodiment of the invention, the by-pass thermostat and valve 110 direct the coolant through coolant line 112 and the auxiliary radiator 28. In the auxiliary radiator 28, excess heat in the coolant is dissipated prior to returning to the auxiliary engine 22.

Once the temperature in the sleeper 14 has reached the preselected desired temperature setting, the control panel 98 receives a signal from the thermostat and sends a signal to the auxiliary valves 96 and 94 turning them off. The coolant flow is now routed from the auxiliary engine 22 to the first auxiliary coolant line 78, through the first auxiliary valve 94, to the third coolant line 76, to the truck engine 41. From the truck engine 41 the coolant flows through the first coolant line 72, into the third auxiliary coolant line 82, through the second auxiliary valve 96, through the third auxiliary coolant line 82, and returns to the auxiliary engine 22. If, however, the temperature of the coolant is, for example, 170° F., it will be routed through the auxiliary radiator 28 prior to returning to the auxiliary engine 22.

A second mode illustrated is for the truck 10 equipped with the standard series arrangement of coolant lines and the auxiliary power unit 8. For this mode, the cab heater 56 and the sleeper heater 60 are run when the both the truck engine 41 and auxiliary engine 22 are in operation. Once the series coolant valve 86, the first auxiliary valve 94, and the second auxiliary valve 96 are opened, as described above and shown in FIGS. 4A and 4B, coolant flows from both the truck engine 41 and the auxiliary engine 22 to the cab heater 56 and the sleeper heater 60. Once the temperature in the sleeper 14 has reached the preselected desired temperature setting, the control panel 98 receives a signal from the thermostat and sends a signal to the first and second auxiliary valves 94 and 96, turning them off. The coolant flow is then routed from the auxiliary engine 22 to the first auxiliary coolant line 78, through the first auxiliary valve 94, to the third coolant line 76, to the truck engine 41. From the truck engine the coolant flows out through the first coolant line 72, into the third auxiliary coolant line 82, through the second auxiliary valve 96, through the third auxiliary coolant line 82, and returns to the auxiliary engine 22. If, however, the temperature of the coolant is, for example, 170° F., it will be routed through the auxiliary radiator 28 prior to returning to the auxiliary engine 22.

A third mode illustrated is for the truck 10 equipped with the standard parallel arrangement of coolant lines and the auxiliary power unit 8. For this mode, the only auxiliary engine 22 is operating and only the sleeper heater 60 is on. The sleeper heater 60 is turned on from the auxiliary control panel 98 in the sleeper 14, by switching the heater/AC/on off switch 104 to heat. The temperature control switch 106 and fan speed switch 108 are set to the desired settings. When the temperature control switch 106 is placed at a particular temperature setting, the thermostat within the sleeper 14 will measure the temperature within the sleeper 14 and send a signal to the auxiliary control panel 98 to operate the first auxiliary valve 94 and second auxiliary valve 96 if the temperature is outside the desired selection. When heat is desired in the sleeper 14, the control panel 98 receives a signal from the thermostat and sends a signal to the first and second auxiliary valves 94 and 96 turning them on. Coolant then flows from the auxiliary engine 22 into the first auxiliary coolant line 78. The coolant then flows into the second coolant line 80, and through the third parallel arrangement auxiliary to coolant line 75. From here the coolant must flow toward the sleeper heater 60 because the check valve 92 prevents the coolant from flow in the third parallel arrangement coolant line 75 to the tractor engine 41. The coolant then enters the sleeper heater 60 where the sleeper fan 62 draws cool air over the sleeper heater 60 where it is warmed. The warmed air is pushed into the sleeper 14 by the sleeper fan 62.

From the sleeper heater 60 the coolant flows through the fourth parallel arrangement coolant line 77 to the first auxiliary valve 94. Here, because the first auxiliary valve 94 is on, coolant continues to flow in the fourth parallel arrangement coolant line 77. Then, because the second auxiliary valve 96 is on, coolant flows through the fourth auxiliary coolant line 84, through the second auxiliary valve 96, through the third auxiliary coolant line 82, returning to the auxiliary engine 22. If, however, the temperature of the coolant is, for example, 170° F. it will be routed through the auxiliary radiator 28 prior to returning to the auxiliary engine 22.

Once the temperature in the sleeper 14 has reached the preselected desired temperature setting, the control panel 98 receives a signal from the thermostat and sends a signal to the first and second auxiliary valves 94 and 96 turning them off. The coolant flow is now routed from the auxiliary engine 22 to the first auxiliary coolant line 78, through the first auxiliary valve 94, to the fourth parallel arrangement coolant line 77, and to the truck engine 41. From the truck engine the coolant flow is out the first parallel arrangement coolant line 71, into the third auxiliary coolant line 82, through the second auxiliary valve 96, through the third auxiliary coolant line 82, and returns to the auxiliary engine 22. If, however, the temperature of the coolant is, for example, 170° F. it will be routed through the auxiliary radiator 28 prior to returning to the auxiliary engine 22.

A fourth mode illustrated is for the truck 10 equipped with the standard parallel arrangement of coolant lines and the auxiliary power unit 8. For this mode, the cab heater 56 and sleeper heater 60 are also run simultaneously when both the auxiliary engine 22 and the truck engine 41 are in operation.

From the above description of the four modes, it will be appreciated by one skilled in the art how the remaining seven modes of operation are to be accomplished. This is so because the remaining modes of operation are achieved merely by switching off or on the cab heater 56, the sleeper heater 60, the truck engine 41, or the auxiliary engine 22.

Further, it should be observed that the heated coolant is distributed on a priority basis. When the user turns on the sleeper heater. 60, coolant is directed first to the sleeper heater 60. If the temperature in the sleeper 14 rises above that selected by the user, coolant is then directed to the truck engine 41. Finally, if the coolant is excessively hot, it is directed to the auxiliary radiator 28.

Although characteristics and advantages, together with details of structure and function have been described in reference to a preferred embodiment herein, it is understood that the disclosure is illustrative. To that degree, various changes made, especially in matters of shape, size and arrangement, to the full extent of the general meaning of the terms in which the appended claims are expressed, are within the principle of the present invention.

What is claimed is:

1. An auxiliary power unit, for use with a vehicle, the vehicle having a main engine, a driving area, an alternative use area, a driving area fan, a driving area evaporator, a compressor, a condenser, an alternative use area fan, an alternative use area evaporator, interconnected by a plurality of refrigerant lines and driven by the vehicle's main engine to provide air conditioning to the driving area and alternative use area; the auxiliary power unit comprises:

a housing containing an auxiliary engine, auxiliary compressor, and auxiliary condenser;
   an auxiliary evaporator, wherein the auxiliary evaporator is arranged in series with the alternative use area fan, and the alternative use area evaporator such that the alternative use area fan causes air flow through both the alternative use area evaporator and the auxiliary evaporator; and a plurality of auxiliary refrigerant lines interconnecting the auxiliary condenser to the auxiliary evaporator, the auxiliary refrigerant lines from the auxiliary compressor and the auxiliary condenser being separate and distinct form the refrigerant lines which connects to the vehicle's condenser when the auxiliary engine is in use, so that refrigerant from the auxiliary compressor and the auxiliary condenser does not flow to the vehicle's condenser; whereby when the auxiliary engine is in use, the alternative use area fan and auxiliary compressor, the auxiliary condenser and the auxiliary evaporator can be activated by a user and powered by the auxiliary engine to provide air conditioning.

2. An auxiliary power unit, in accordance with claim 1, the vehicle having at least one fuel tank wherein the fuel used by the vehicle engine is stored, and the auxiliary engine also uses this fuel supply.

3. An auxiliary power unit, in accordance with claim 1, the vehicle having a battery; and the auxiliary power unit comprises an alternator, whereby the auxiliary engine powers the alternator which can recharge the battery.

4. An auxiliary power unit, in accordance with claim 1, the vehicle includes a driving area heater, an alternative use area heater, and a plurality of coolant lines; the alternative use area heater is arranged in series with the alternative use area fan, alternative use area evaporator and auxiliary evaporator; the coolant lines interconnect the vehicle's engine to the driving area heater, and the alternative use area heater, whereby when the vehicle's engine is in use, the driving area fan, alternative use area fan, driving area heater, and alternative use area heater can be activated by the user to heat the driving area and alternative use area; and the auxiliary power unit has a plurality of auxiliary coolant lines, wherein the auxiliary coolant lines are interconnected with the plurality of coolant lines, whereby when the auxiliary engine is in use, the alternative use area fan, and the alternative use area heater can be activated by the user to provide heat to the alternative use area when the vehicle's engine is not in use.

5. An auxiliary power unit, in accordance with claim 4, wherein the plurality of coolant lines are interconnected with the auxiliary coolant lines by a valving means for controlling the flow of coolant within the coolant lines and auxiliary coolant lines, whereby the auxiliary engine and the vehicle's engine can be in use simultaneously.

6. An auxiliary power unit, in accordance with claim 4, wherein the vehicle engine can be heated by coolant from the auxiliary engine.

7. An auxiliary power unit, in accordance with claim 1, comprising an auxiliary radiator, wherein the auxiliary condenser is arranged in series with the auxiliary radiator.

8. An auxiliary power unit, in accordance with claim 1, comprising an auxiliary radiator, a by-pass thermostat and valve, and a plurality of auxiliary valves; whereby the flow of coolant is directed on a priority basis first to the alternative use area heater, second to the vehicle's main engine, and third to the auxiliary radiator, so as to prioritize the heat transfer first to the alternative use area, secondly to the vehicle's main engine, and only as necessary to the auxiliary radiator.

9. An auxiliary power unit, in accordance with claim 1, further comprising an auxiliary radiator, a by-pass thermostat and valve, and a plurality of auxiliary valves, the by-pass thermostat and valve interconnecting an alternative use area heater and a truck heater to the auxiliary engine when a temperature in said heaters is under a predetermined degree, the by-pass thermostat and valve interconnecting the alternative use area heater and the truck heater to the auxiliary radiator when the temperature in said heaters is beyond the predetermined degree, the auxiliary radiator further connecting to the auxiliary engine, so that when the temperature is under the predetermined degree, a flow of coolant from said heaters directly flowing to the auxiliary engine, when the temperature is beyond the predetermined degree, a flow of coolant from said heaters flowing to the auxiliary radiator and then flowing to the auxiliary engine.

10. An auxiliary power unit, for use with a truck, the truck having an engine, a cab, a sleeper, a cab evaporator, a sleeper evaporator, a compressor, a condenser, and a plurality of refrigerant lines, and a cab heater, a sleeper heater, a plurality of coolant lines, and a cab fan and a sleeper fan, whereby when the truck engine is in use, the truck fan, the sleeper fan, the cab evaporator, the sleeper evaporator, the compressor and the condenser can be activated by a user, and be powered by the truck engine to air condition the cab and sleeper, alternatively, the cab fan, the sleeper fan, the cab heater, and the sleeper heater can be activated by the user, and be powered by the truck engine, to heat the cab and sleeper; the auxiliary power unit comprises:

a housing containing an auxiliary engine;

an auxiliary compressor, an auxiliary condenser, and auxiliary evaporator and a plurality of auxiliary refrigerant lines, the auxiliary refrigerant lines interconnecting the auxiliary condenser to the auxiliary evaporator, the auxiliary refrigerant lines from the auxiliary compressor and the auxiliary condenser are separate and distinct from the refrigerant lines which connects to the vehicle's condenser when the auxiliary engine is in use, so that refrigerant from the auxiliary compressor and the auxiliary condenser does not flow to the vehicle's condenser, wherein the auxiliary evaporator is arranged in series with the sleeper fan, the sleeper heater and the sleeper evaporator; and a plurality of auxiliary coolant lines, wherein the auxiliary coolant lines interconnect the truck coolant lines to the auxiliary engine;

whereby when the auxiliary engine is in use, the sleeper fan, auxiliary compressor, auxiliary condenser and auxiliary evaporator can be activated by the user, and be powered by the auxiliary engine, to provide air conditioning for the sleeper, alternatively, the sleeper fan, and the sleeper heater can be activated by the user and be powered by the auxiliary engine, to provide heat to the sleeper.

11. An auxiliary power unit, in accordance with claim 10, the truck having at least one fuel tank wherein the fuel used by the truck engine is stored, and the auxiliary engine also uses this fuel supply.

12. A auxiliary power unit, in accordance with claim 10, the truck having a battery; and the auxiliary power unit comprises an alternator, whereby the auxiliary engine powers the alternator which can recharge the battery.

13. A auxiliary power unit, in accordance with claim 10, wherein a unified control panel controls the air conditioning and heating within the sleeper when only the auxiliary engine is in use, when the truck engine is in use, or when both the auxiliary engine and the truck engine are in use.

14. An auxiliary power unit, in accordance with claim 10, wherein the truck's plurality of coolant lines are interconnected with auxiliary coolant lines by a valving means for controlling the flow of coolant within the coolant lines and the auxiliary coolant lines, whereby the auxiliary engine and the truck engine can be in use simultaneously.

15. An auxiliary power unit, in accordance with claim 10, wherein the cab evaporator, the sleeper evaporator, and the auxiliary evaporator can be used simultaneously.

16. An auxiliary power unit, in accordance with claim 10, wherein the truck engine can be heated by coolant heated by the auxiliary engine.

17. An auxiliary power unit, in accordance with claim 10, comprising an auxiliary radiator, wherein the auxiliary condenser is arranged in series with the auxiliary radiator.

18. An auxiliary power unit, in accordance with claim 10, whereby when the truck engine and the auxiliary engine are in use, the sleeper fan, the compressor, the condenser, and sleeper evaporator can be activated by the user, to provide air conditioning for the sleeper; alternatively, the sleeper fan, and the sleeper heater can be activated by the user to provide heat to the sleeper.

19. An auxiliary power unit, in accordance with claim 10, comprising an auxiliary radiator and a by-pass thermostat and valve for directing excessively hot coolant returning from the plurality of auxiliary coolant lines and the plurality of coolant lines to the auxiliary radiator prior to returning to the auxiliary engine.

20. An auxiliary power unit, in accordance with claim 10, comprising an auxiliary radiator, a by-pass thermostat and value, and a plurality of auxiliary valves; whereby the coolant is directed on a priority basis first to the sleeper heater, second to the truck's engine, and third to the auxiliary radiator so as to prioritize heat transfer first to the sleeper, secondly to the truck engine, and only as necessary to the auxiliary radiator.

21. An auxiliary power unit, in accordance with claim 10, further comprising an auxiliary radiator, a by-pass thermostat and valve, and a plurality of auxiliary valves, the by-pass thermostat and valve interconnecting the sleeper heater and the cab heater to the auxiliary engine when a temperature in said heaters is under a predetermined degree, the by-pass thermostat and valve interconnecting the sleeper heater and the cab heater to the auxiliary radiator when the temperature in said heaters is beyond the predetermined degree, the auxiliary radiator further connecting to the auxiliary engine, so that when the temperature is under the predetermined degree, a flow of coolant from said heaters is directly flowing to the auxiliary engine, when the temperature is beyond the predetermined degree, a flow of coolant from said heaters flowing to the auxiliary radiator and then flowing to the auxiliary engine.

22. An auxiliary climate control unit for use with a truck, the truck having an engine, a cab, a sleeper, a cab heater, a sleeper heater, a condenser, a plurality of refrigerant lines, a sleeper evaporator, a plurality of coolant lines, and a cab fan and sleeper fan; whereby when the truck engine is in use, the truck fan, the sleeper fan, the cab heater, and the sleeper heater can be activated by the user, and be powered by the truck engine to heat the cab and sleeper; the auxiliary climate control unit comprises:
 a plurality of auxiliary coolant lines, wherein the auxiliary coolant lines interconnect the truck coolant lines to the auxiliary engine;
 an auxiliary compressor, an auxiliary condenser, and auxiliary evaporator and a plurality of auxiliary refrigerant lines, the auxiliary refrigerant lines interconnecting the auxiliary condenser to the auxiliary evaporator, the auxiliary refrigerant lines from the auxiliary compressor and the auxiliary condenser are separate and distinct from the refrigerant lines which connects to the truck's condenser when the auxiliary engine is i use, so that the refrigerant from the auxiliary compressor and the auxiliary condenser does not flow to the truck's condenser, wherein the auxiliary evaporator is arranged in series with the sleeper fan, the sleeper eater and the sleeper evaporator;
 whereby the sleeper fan and the sleeper heater can be activated by the user, and be powered by the auxiliary engine, to provide heat to the sleeper; and whereby the truck engine and the auxiliary engine are in use, the sleeper fan and the sleeper heater can be activated by the user to provide heat to the sleeper.

* * * * *